United States Patent
Tamegai et al.

(10) Patent No.: US 6,287,081 B1
(45) Date of Patent: Sep. 11, 2001

(54) CONTROL APPARATUS FOR HYBRID COMPRESSOR

(75) Inventors: Masahiko Tamegai; Kazuhiro Irie, both of Konan (JP)

(73) Assignee: Zexel Corporation, Tokyo (JP)

( * ) Notice: Subject to any disclaimer, the term of this patent is extended or adjusted under 35 U.S.C. 154(b) by 0 days.

(21) Appl. No.: 09/468,308

(22) Filed: Dec. 21, 1999

(30) Foreign Application Priority Data

Jan. 8, 1999 (JP) .................................................. 11-003303

(51) Int. Cl.⁷ .................................................. F04B 49/00
(52) U.S. Cl. .................................. 417/15; 417/16; 417/34; 62/236; 62/133
(58) Field of Search .................................. 417/15, 16, 34, 417/316; 62/236, 133, 323.4, 228.4

(56) References Cited

U.S. PATENT DOCUMENTS

| | | |
|---|---|---|
| 3,977,816 | 8/1976 | Laing . |
| 5,867,996 * | 2/1999 | Takano et al. .......................... 62/236 |
| 5,934,089 * | 8/1999 | Nakagawa et al. ..................... 62/133 |
| 6,230,507 * | 5/2001 | Ban et al. ............................... 62/236 |

FOREIGN PATENT DOCUMENTS

| | | | |
|---|---|---|---|
| 198 07 326 | 8/1998 | (DE) . | |
| 0 715 979 | 6/1996 | (EP) . | |
| 1045144-A1 * | 10/2000 | (EP) | ....................................... 62/236 |
| 57-191118-A * | 11/1982 | (JP) | ....................................... 62/236 |
| 4-126628 | 4/1992 | (JP) | ....................................... 62/236 |
| 4-126628-A * | 4/1992 | (JP) | ....................................... 62/236 |
| 5-139151 | 6/1993 | (JP) . | |
| 11-99824-A * | 4/1999 | (JP) | ....................................... 62/133 |

* cited by examiner

Primary Examiner—Cheryl J. Tyler
(74) Attorney, Agent, or Firm—Wenderoth, Lind & Ponack, L.L.P.

(57) ABSTRACT

In order to achieve a smooth shift between two drive sources, an electromagnetic clutch is engaged, when the rotation rate of the compression unit and the engine rotation rate match, to switch from motor drive to engine drive during engine startup or engine acceleration. The motor is driven before the electromagnetic clutch is cut off to switch from engine rive to motor drive during engine stop or engine deceleration.

20 Claims, 10 Drawing Sheets

CONTROL APPARATUS FOR HYBRID COMPRESSOR

BACKGROUND

The present invention relates to a control apparatus for a hybrid compressor that is installed in an air conditioning system mounted in a hybrid vehicle, wherein the compressor may be driven by at least two driving means that include an engine and a motor. Examples of hybrid vehicles include an idle-stop vehicle which has no idle running state and the like. The hybrid compressor may be provided with two driving means, one achieved through a driving force obtained via linkage with the engine and the other achieved through a driving force imparted by a dedicated motor.

Hybrid compressors in the prior art include the one disclosed in Japanese Unexamined Utility Model Publication No. H6-87678. In this hybrid compressor, which obtains a driving force either through linkage with the engine or through a battery operated motor, the compression unit is driven as it is selectively linked with these two drive sources. More specifically, when the engine is in a driving state, the driving force is obtained by linking a rotary shaft of the engine through an electromagnetic clutch, whereas when the engine is in a stopped state, the driving force is obtained through the rotation of the motor.

However, when switching from motor drive to engine drive or switching from engine drive to motor drive in the hybrid compressor described above, there is a problem in that the switching of the drive source cannot be carried out smoothly due to different rotation rates and different rotation torques of the two drive sources. There is another problem in that the difference between the rotation rates of the two drive sources causes noise when the electronic clutch engages.

SUMMARY OF THE INVENTION

An object of the present invention is to provide a control apparatus for a hybrid compressor that achieves a smooth shift between the two drive sources of the hybrid compressor.

Accordingly, a control apparatus for a hybrid compressor according to the present invention which is employed to control a hybrid compressor comprising a rotating shaft (i.e. rotary shaft), a compression unit having a compression space whose volumetric capacity is caused to change by the rotation of the rotating shaft, an electromagnetic clutch that links a pulley to which the rotation of an engine is communicated and the rotating shaft as appropriate to communicate the rotation of the engine to the rotating shaft and a motor unit achieved by providing a rotor secured to the rotating shaft and a stator facing opposite the rotor, to constitute a portion of a freezing cycle installed in an airconditioning system is provided with a means for engine operation decision-making that makes a decision with respect to the operating state of the engine, a means for airconditioning system operation decision-making that makes a decision with respect to the operating state of the airconditioning system, a means for motor unit drive that drives a motor unit, a means for electromagnetic clutch drive that links a pulley with the rotating shaft or cuts off the pulley from the rotating shaft by turning the electromagnetic clutch on/off, a means for engine drive that drives the engine and a means for stop control that cuts off the linkage between the pulley and the rotating shaft by turning off the electromagnetic clutch via the means for electromagnetic clutch drive after starting up the motor unit via the means for motor unit drive, and then stops the drive of the engine via the means for engine drive, if the means for engine operation decision-making decides that the engine is to stop operation and the means for airconditioning system operation decision-making decides that the airconditioning system is to sustain operation.

Thus, since the means for stop control first drives the motor unit via the means for motor unit drive and then turns off the electromagnetic clutch via the means for electromagnetic clutch drive as the rotation rate of the compression unit becomes lower, if the means for engine operation decision-making decides that the engine is to be stopped and the means for airconditioning system operation decision-making decides that the airconditioning system is to sustain operation, the leading edge torque at the motor unit can be reduced to achieve a smooth shift from engine drive to motor drive.

In addition, in the control apparatus for a hybrid compressor according to the present invention, which is further provided with a means for engine rotation rate detection that detects the rotation rate of the engine, the means for stop control engages the motor unit in operation via the means for motor unit drive when the rotation rate of the engine detected by the means for engine rotation rate detection has decreased to a first specific rotation rate, and cuts off the linkage of the pulley and the rotating shaft via the means for electromagnetic clutch drive when the rotation rate of the engine has further decreased to a second specific rotation rate lower than the first specific rotation rate.

Since the means for stop control engages the motor unit in operation via the means for motor unit drive when the rotation rate of the engine detected by the means for engine rotation rate detection has decreased to the first specific rotation rate and then turns off the electromagnetic clutch via the means for electromagnetic clutch drive when the rotation rate of the engine has further decreased to the second specific rotation rate lower than the first specific rotation rate, the electromagnetic clutch can be turned off with a high degree of reliability after the motor unit is engaged in operation. In addition, the time lag between the point in time at which the means for motor unit drive starts to drive the motor and the point in time at which the electromagnetic clutch is cut off by the means for electromagnetic clutch drive may be set by providing a timer that starts upon the start of motor drive and measures the length of time elapsed to ensure that the electromagnetic clutch is turned off with a specific time lag after the motor unit is engaged in operation.

Furthermore, the first specific rotation rate may be set at a value that is higher than the engine idling rotation rate by a specific value with the second specific rotation rate set at the idling rotation rate. Alternatively, the first specific rotation rate may be set at a target rotation rate to be achieved at the compression unit through the motor unit, with the second specific rotation rate set at a rotation rate lower than the target rotation rate by a specific value.

The control apparatus for a hybrid compressor according to the present invention may further comprise a means for compression unit rotation rate detection that detects the actual rotation rate of the compression unit, a means for target discharge quantity calculation that performs an arithmetic operation to determine the quantity of discharge achieved by the compression unit based upon a heat load factor, a means for motor target rotation rate setting that sets a target rotation rate for the compression unit to be achieved through the motor unit based upon the target discharge quantity calculated by the means for target discharge quantity calculation, a means for motor unit drive decision-making that judges whether said motor unit is operating at said motor target rotation rate set by said means for motor target rotation rate setting, a means for engine rotation rate setting that sets a target rotation rate for the compression unit to be achieved through the engine based upon the target discharge quantity calculated by the means for target discharge quantity calculation, a means for engine rotation rate detection that detects the actual rotation rate of the engine, a means for estimated rotation rate calculation that performs an arithmetic operation to determine an estimated rotation rate of the compression unit that corresponds to the actual rotation rate detected by the means for engine rotation rate detection, a means for target rotation rate comparison that starts up the motor unit via the means for motor unit drive if the means for engine operation decision-making decides that the engine is to be started up, the means for airconditioning system operation decision-making decides that the airconditioning system is to operate, starts up the engine via the means for engine drive after the means for motor unit operation decision-making decides that the motor unit is operating at the motor target rotation rate, and compares the motor target rotation rate set by the means for motor target rotation rate setting and the engine target rotation rate set by the means for engine rotation rate setting, a first means for startup control that stops the drive of the motor unit via the means for motor unit drive if the means for target rotation rate comparison decides that the engine target rotation rate is lower than the motor target rotation rate and links the electromagnetic clutch via the means for electromagnetic clutch drive when the actual rotation rate detected by the means for compression unit rotation rate detection matches the estimated rotation rate calculated by the means for estimated rotation rate calculation and a second means for startup control that links the electromagnetic clutch via the means for electromagnetic clutch drive when the estimated rotation rate calculated by the means for estimated rotation rate calculation matches the actual rotation rate detected by the means for compression unit rotation rate detection and then stops the drive of the motor unit via the means for motor unit drive, if the means for target rotation rate comparison decides that the engine target rotation rate is higher than the motor target rotation rate.

Thus, at an engine startup, after the compression unit is engaged in operation by the motor unit via the means for motor unit drive first, the engine is driven by the means for engine drive and the motor target rotation rate and the engine target rotation rate are compared with each other by the means for target rotation rate comparison. If the engine target rotation rate is lower than the motor target rotation rate in this comparison, the motor unit is stopped by the first means for startup control and the electromagnetic clutch is engaged at the point in time at which the falling rotation rate of the compression unit and the rising estimated rotation rate of the compression unit to be achieved by the engine match each other so that the noise occurring when the electromagnetic touch is engaged is reduced and so that the switch from the motor unit to the engine can be carried out smoothly.

In addition, if the engine target rotation rate is higher than the motor target rotation rate in the comparison, the second means for startup control engages the electromagnet clutch at the point in time at which the estimated rotation rate of the compression unit to be achieved by the engine matches the actual rotation rate of the compression unit so that the noise occurring when the electromagnetic clutch is engaged is reduced and so that the switch from the motor unit to the engine can be carried out smoothly.

Alternatively, the control apparatus for a hybrid compressor according to the present invention may further comprise a means for compression unit rotation rate detection that detects the actual rotation rate of the compression unit, a means for engine rotation rate detection that detects the actual rotation rate of the engine, a means for estimated rotation rate calculation that performs an arithmetic operation to determine an estimated rotation rate of the compression unit that corresponds to the actual rotation rate detected by the means for engine rotation rate detection and a means for acceleration control that turns on the electromagnetic clutch via the means for electromagnetic clutch drive to link the pulley and the rotating shaft and if the estimated rotation rate calculated by the means for estimated rotation rate calculation increases to be equal to or greater than the actual rotation rate detected by the means for compression unit rotation rate detection while the motor unit is driven by the means for motor unit drive and the electromagnetic clutch is set in an OFF state by the means for electromagnetic clutch drive and then turns off the motor unit via the means for motor unit drive.

Thus, the means for acceleration control engages the electromagnetic clutch at the point in time at which the estimated rotation rate of the compression unit to be achieved by the engine increases to be equal to or greater than the actual rotation rate of the compression unit if the engine is accelerated while the compression unit is engaged in operation by the motor unit and then the motor unit is turned off so that the shift from motor drive to engine drive can be achieved as necessary to prevent the power at the motor unit from becoming depleted.

As another alternative, the control apparatus for a hybrid compressor according to the present invention may further comprise a means for compression unit rotation rate detection that detects the actual rotation rate of the compression unit, a means for target discharge quantity calculation that performs an arithmetic operation to determine the quantity of discharge from the compression unit based upon a heat load factor, a means for motor target rotation rate setting that sets a target rotation rate for the compression unit to be achieved by the motor unit based upon the target discharge quantity calculated by the means for target discharge quantity calculation and a means for deceleration control that starts up the motor by the means for motor unit drive at the point in time at which the actual rotation rate detected by the means for compression unit rotation rate detection is reduced to be equal to or less than the target rotation rate set by the means for motor target rotation rate setting while the electromagnetic clutch is set in an ON state by the means for electromagnetic clutch drive and the motor unit is set in an OFF state by the means for motor unit drive and then turns off the electromagnetic clutch via the means for electromagnetic clutch drive to cut off the pulley from the rotating shaft.

In this structure, if the engine is decelerated while the compression unit is engaged in operation by the engine, the motor unit is turned on at the point in time at which the actual rotation rate of the compression unit is reduced to be equal to or less than the motor unit target rotation rate and then the electromagnetic clutch is turned off, so that the shift from engine drive to motor drive can be achieved as necessary to prevent any reduction in the capability of the compression unit caused by a reduction in the engine rotation rate.

BRIEF DESCRIPTION OF THE DRAWINGS

Further objects and advantages of the invention can be more fully understood from the following detailed description given in conjunction with the accompanying drawings, in which.

DESCRIPTION OF THE PREFERRED EMBODIMENT

Figure 1:
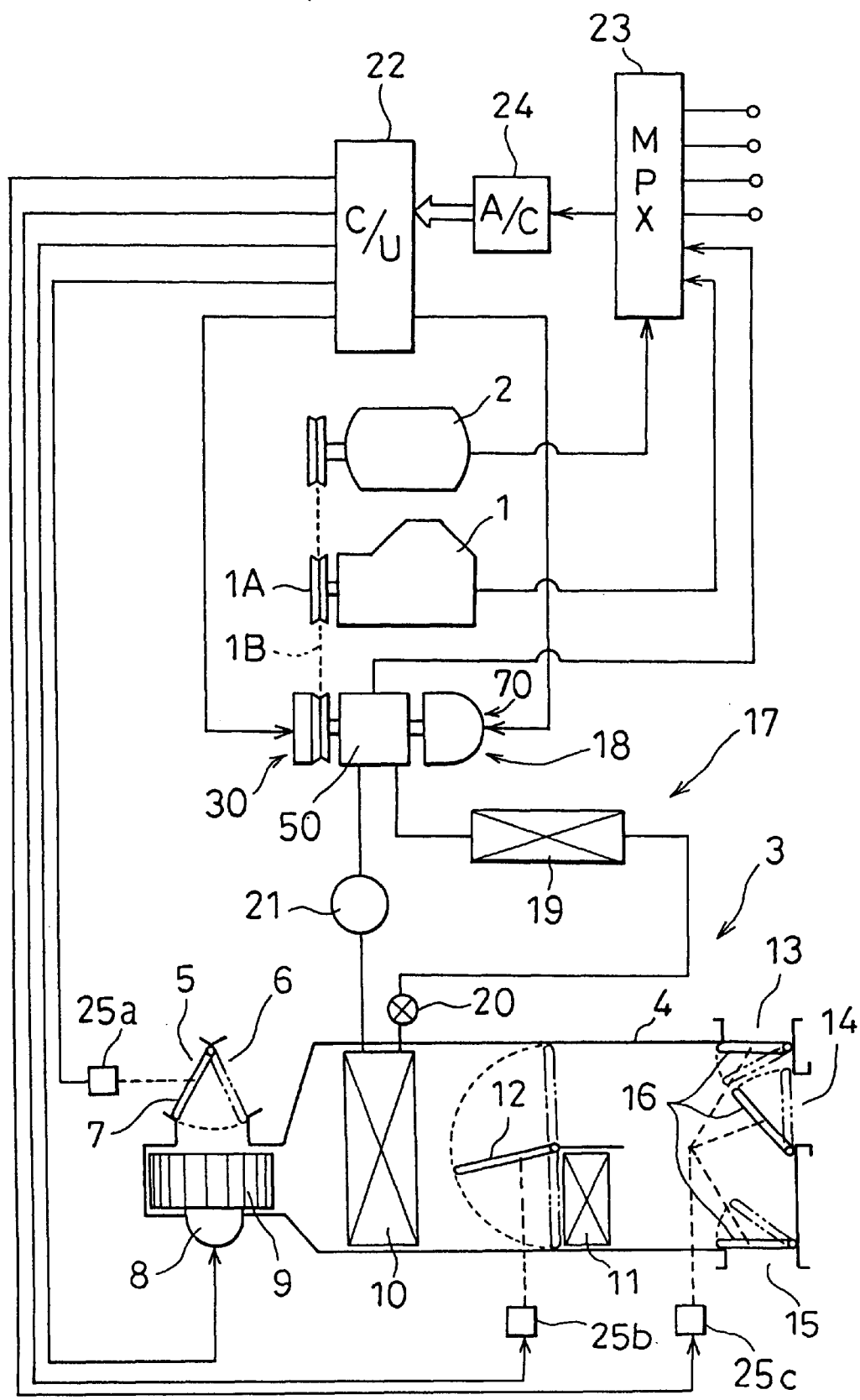
FIG. 1 is a schematic illustration of an airconditioning system mounted on a hybrid vehicle.

FIG. 1 schematically illustrates an airconditioning system 3 which is mounted on a hybrid vehicle having at least two drive sources, i.e., an internal combustion engine (hereafter referred to as the "engine") 1 such as a gasoline engine or a diesel engine and a drive motor 2 driven by battery. This airconditioning system 3, which is provided with an internal air intake 5 and an external air intake 6 opening on an upstream side of an airconditioning duct 4, is further provided with an intake door 7 that selectively opens the internal air intake 5 and the external air intake 6 as appropriate. In addition, to the downstream side relative to the internal air intake 5 and the external air intake 6, a fan 9 driven by a motor 8 is provided to draw in internal air or external air flowing from the internal air intake 5 or the external air intake 6 selected by the intake door 7 and direct the air to the downstream side of the airconditioning duct 4.

To the downstream side relative to the fan 9, an evaporator 10 constituting a cooling heat exchanger is provided, and to the downstream side relative to the evaporator 10, a heater core 11 constituting a heating heat exchanger is provided. In addition, to the upstream side relative to the heater core, an air mix door 12 that divides the air having passed through the evaporator 10 into air to pass through the heater core 11 and air to bypass the heater core 11 is provided. The air divided at the air mix door 12 is mixed together in the space located to the downstream side relative to the heater core 11 and is discharged through an outlet 13, 14 or 15 opening at the downstream-most side of the airconditioning duct 4 that is selected by a mode door 16.

The airconditioning system 3 is provided with a freezing cycle 17 that includes the evaporator 10. The freezing cycle 17 is constituted of, at least, a compressor 18 that compresses a coolant, a condenser (radiator) 19 that cools the compressed coolant, an expansion valve 20 that causes adiabatic expansion of the cooled coolant, the evaporator 10 that causes the coolant having undergone the process of adiabatic expansion to evaporate and an accumulator 21 that achieves gas-liquid separation of the coolant and coolant quantity adjustment.

A control unit (C/U) 22 is provided to control the airconditioning system 3 structured as described above. Environment signals constituting heat load factors such as an external air temperature signal, a cabin internal temperature signal and a solar radiation quantity signal are input to the control unit 22 via a multiplexer (MPX) 23, an analog-digital converter (A/C) 24 and the like, as well as signals from an operation panel (not shown). In addition, signals unique to a hybrid vehicle that indicate the operating states of the engine 1 and the drive motor 2 and the like are input to the control unit 22. These input signals, which are processed in conformance to a program executed in the control unit 22, are output as specific control signals to implement control on an actuator 25a that drives the intake door 7, an actuator 25b that drives the motor 8 and the air mix door 12, an actuator 25c that drives the mode doors 16, and an electromagnetic clutch 30, a motor unit 70 and the like at the compressor 18 which is to be detailed below.

The compressor 18, which is mounted in the freezing cycle of the airconditioning system 3 structured as described above, is a so-called hybrid compressor having two drive sources, i.e., the engine and a dedicated motor. Namely, the hybrid compressor 18 comprises the electromagnetic clutch that achieves linkage with and disconnection from with the engine 1, a compression unit 50 that engages in a compression process and a motor unit 70 that is driven by battery (not shown).

Figure 2:
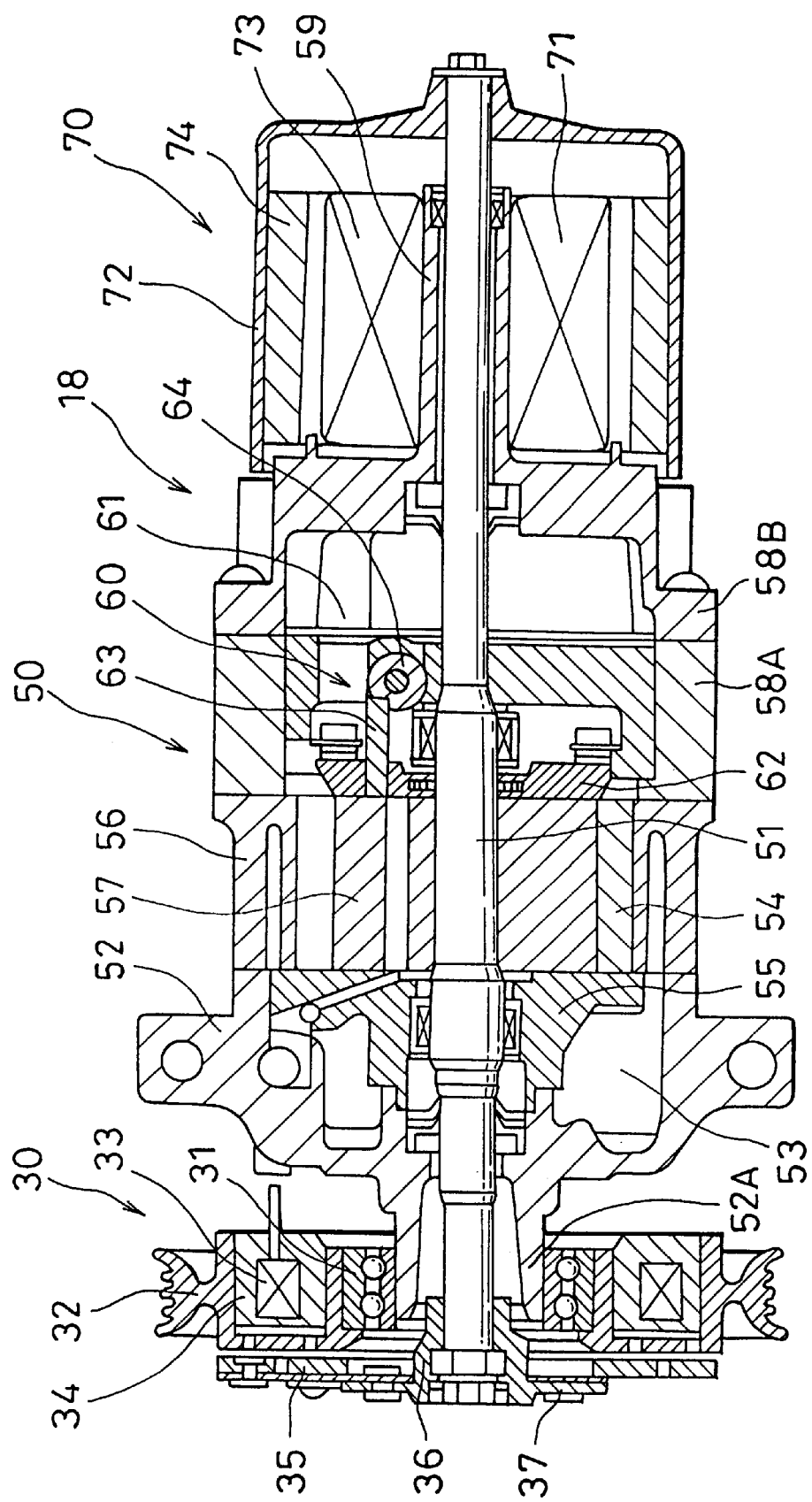
FIG. 2 is a schematic cross section illustrating an example of a hybrid compressor.

In more specific terms, the hybrid compressor 18, which may be structured as shown in FIG. 2, for instance, comprises the compression unit 50, a rotating shaft 51 that passes through the compression unit 50, the electromagnetic clutch 30 that is provided at one end of the rotating shaft 51 and the motor unit 70 provided at the other end of the rotating shaft 51.

The compression unit 50 is constituted of a front head 52 to which the electromagnetic clutch 30 is securely mounted, a front side block 55 that is provided inside a high pressure space 53 defined inside the front head 52 and blocks off a compression space 54 on one side along the axial direction, a cylinder block 56 that defines the compression space 54, a rotor 57 that is provided inside the compression space 54 and varies the volumetric capacity of the compression space 54 and rear heads 58A and 58B that block off the compression space 54 on the other side along the axial direction.

In addition, a volumetric capacity varying mechanism 60 is provided at an intake space 61 defined inside the rear heads 58A and 58B. The volumetric capacity varying mechanism 60 comprises a rotating plate 62 that displaces the position of an intake port (not shown) communicating between the compression space 54 and the intake space 61 relative to the compression space 54, a rod 63 provided to cause the rotating plate 62 to rotate and a displacing mechanism 64 that causes displacement of the front end of the rod 63. By adopting this structure, the position at which the compression space starts to communicate with the intake space 61 during the intake phase can be retarded to reduce the discharge quantity, whereas the position at which the communication starts can be advanced to increase the discharge quantity.

The electromagnetic clutch 30 is secured to a front end 52a of the front head 52 if the compression unit 50 via a bearing 31. A pulley 32 that is connected with a pulley 1A of the internal combustion engine 1 via a belt 1B is provided at the external circumference of the bearing 31. The pulley 32, which is provided with an electromagnetic clutch plate 34 excited by a coil 33, engages in rotation at all times while the internal combustion engine 1 is in operation.

At the position facing opposite the electromagnetic clutch plate 34, an armature 35 is provided, and a hub portion 36 secured to the rotary shaft 51 and the armature 35 are linked via an elastic member 37 constituted of a plate spring or the like. Thus, when power is supplied to the coil 33, the armature 35 is forced onto the electromagnetic clutch plate 34 to cause the pulley 32 and the hub portion 36 to become linked with each other, so that the rotation of the engine 1 is communicated to rotary shaft 51.

The motor unit 70 is constituted of a stator 71 formed at the rear head 58B of the compression unit 50 and secured to a motor mounting projection 59 through which the rotating shaft 51 passes and a rotor 72 secured to the front end of the rotating shaft 51. In this embodiment, the motor unit 70 is a brushless motor, with a coil 73 that generates a rotating magnetic field wound around the stator 71 and a permanent magnet 74 provided at the rotor 72 at a position facing opposite the stator 71.

The hybrid compressor 18 structured as described above is controlled in conformance to a program executed in the control unit 22, and the following is an explanation of control representing an example of such a program given in reference to a flowchart.

Figure 3:
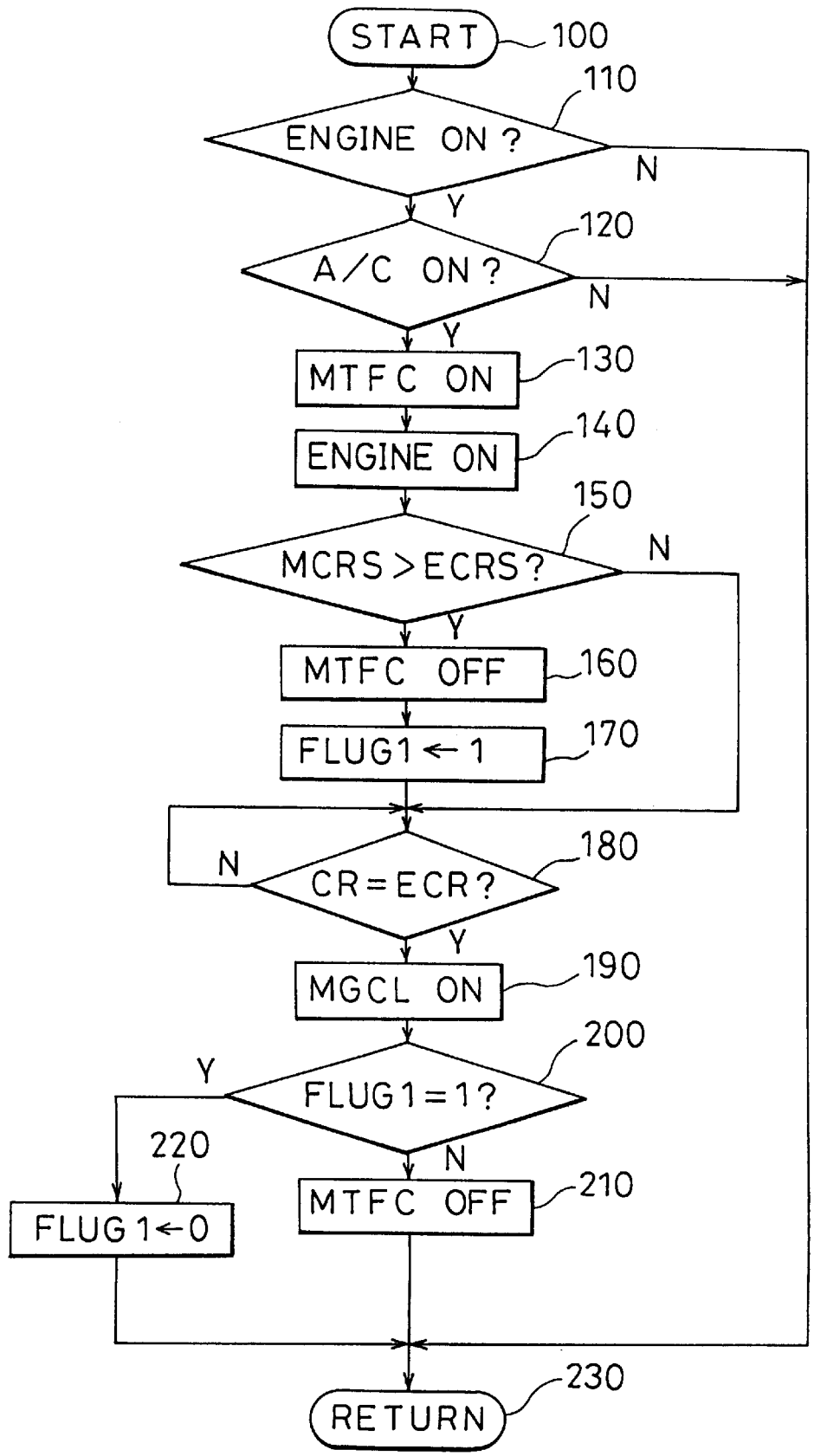
FIG. 3 is a flowchart of the control implemented on the hybrid compressor at an engine startup.

The control implemented on the hybrid compressor 18 at engine startup in the flowchart in FIG. 3 is called up from the routine for implementing the main control on the airconditioning system 3 by a periodic timer interruption or a jump instruction and starts from step 100. In the flowchart, a decision is made as to whether or not the engine 1 is to be turned on in step 110, and if it is decided that the engine 1 is not to be turned on, the operation proceeds to step 230 to return to the main control routine or another control routine by exiting this control. If, on the other hand, it is decided in step 110 that the engine 1 is to be turned on, the operation proceeds to step 120 to make a decision as to whether or not an operation of the airconditioning system (A/C) 3 and, in particular, the operation of the hybrid compressor 18, has been requested. If the operation of the air conditioning system (A/C) 3 has not been requested, the operation proceeds to step 230 to exit this control as described earlier.

When it is decided in step 110 and step 120 that operation of the engine 1 and operation of the airconditioning system (A/C) 3 are requested, startup initial control is executed on the hybrid compressor 18, in which, first, in step 130, the motor unit (MTFC) 70 of the hybrid compressor 18 is turned on and after the operation of the motor unit starts, the engine 1 is started up (ON) in step 140.

Then, in the decision-making process implemented in step 150, a target rotation rate (MCRS) for the compression unit 50 to be achieved by the motor unit 70 and a target rotation rate (ECRS) for the compression unit 50 to be achieved by the engine 1 are compared against each other. The target compression rate (MCRS) for the compression unit 50 to be achieved by the motor unit 70 and the target rotation rate (ECRS) for the compression unit 50 to be achieved by the engine 1 are set based upon the target discharge quantity for the hybrid compressor 18 calculated by using an integrated signal (or a target discharge temperature signal) which, in turn, is calculated based upon a heat load signal and the like.

More specifically, the integrated signal T is calculated through the arithmetic formula (1) shown below, and the target discharge quantity (SCC) for the hybrid compressor 18 is calculated by using a specific map set in correspondence to the integrated signal T. It is to be noted that the map is prepared based upon the optimal relationship between the integrated signal T and the target discharge quantity determined through testing or the like.

$$T = K1 \cdot Tout + K2 \cdot Tin + K3 \cdot Qsun - K4 \cdot Td + K5 \tag{1}$$

It is to be noted that Tout indicates the external air temperature, Tin indicates the cabin internal temperature, Qsun indicates the solar radiation quantity and Td indicates the temperature setting, with K1, K2, K3 and K4 each representing an operational constant and K5 representing a correction term. In addition, the target discharge quantity SCC calculated by using the specific map is determined in correspondence to the compressor rotation rate CR and the discharge capacity CC per rotation at the compression unit 50 (SCC=K6*CR*CC: K6 is an operational constant), and the compressor rotation rate CR corresponds to the rotation rate MR at the motor unit 70 (at a ratio of 1:1 in this embodiment) and also corresponds to the rotation rate ER of the engine 1 at a specific ratio (the ratio of the radii of the pulley 1a and the pulley 32; K7 to be detailed later). Thus, the target rotation rate MCRS for the compression unit 50 to be achieved by the motor unit 70 and the target rotation rate ECRS for the compression unit 50 to be achieved by the engine that correspond to the target discharge quantity (SCC) can be determined through an arithmetic operation performed by using arithmetic formulae (2) and (3) below.

$$ECRS = f(SCC, ECR, ECC) \tag{2}$$

It is to be noted that ECR indicates the estimated rotation rate of the compression unit 50 caused to rotate by the engine 1 (corresponds to the actual rotation rate achieved through linkage via the electromagnetic clutch 30: ECR= K7* ER) and ECC indicates the discharge capacity per rotation of the compression unit 50 caused to rotate by the driving force imparted by the engine 1.

$$MCRS = f(SCC, MCR, MCC) \tag{3}$$

It is to be noted that MCR indicates the estimated rotation rate of the compression unit 50 caused to rotate by the motor unit 70 (MCR=CR) and MCC indicates the discharge capacity per rotation of the compression unit 50 caused to rotate by the driving force imparted by the motor unit 70.

If it is decided in step 150 that the target rotation rate MCRS for the compression unit 50 to be achieved by the motor unit 70 is higher than the target rotation rate ECRS for the compression unit 50 to be achieved by the engine 1, the operation proceeds to step 160 to stop the motor unit (MTFC) 70. In step 170, "1"is set at the flag (FLUG) 1, and the decision-making in step 180 is repeated until the actual rotation rate CR at the compression unit 50 matches the estimated rotation rate ECR for the compression unit 50 achieved by the engine. When they match, the operation proceeds to step 190 to engage (ON) the electromagnetic clutch (MGCL). In step 200 it is decided that the flag (FLUG) 1 has already been set at "1", and thus, the operation skips step 210 to proceed to step 220. Then, the operation returns to the main control routine or another control routine from step 230 to exit this control.

Figure 4:
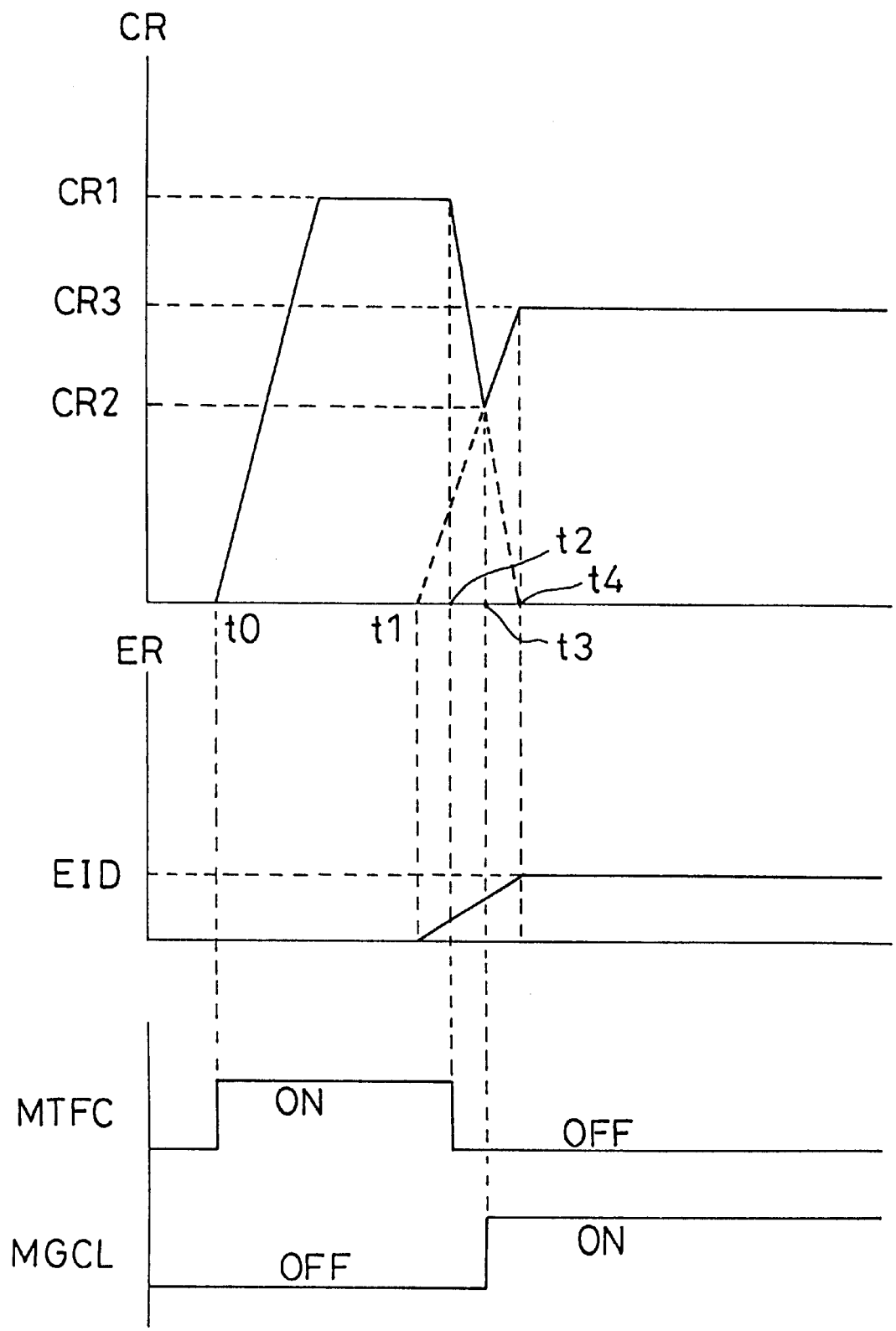
FIG. 4 is a timing chart of the first startup control implemented at an engine startup.

To explain the first startup control in reference to the timing chart in FIG. 4, if it is decided in steps 110 and 120 that an operation of the hybrid compressor 18 is requested during an initial stage of a startup of the engine 1, the motor unit (MTFC) 70 is turned ON at t0 (step 130), and the rotation rate CR at the compression unit 50 increases to a rotation rate CR1 that corresponds to the target rotation rate (MCRS) for the compression unit 50 to be achieved by the motor unit 70. Then, at t1, the engine 1 is turned on (step 140), the rotation rate ER of the engine gradually increases to achieve an idling rotation rate EID after a specific length of time has elapsed, and as the engine rotation rate increases, the estimated rotation rate ECR of the compression unit 50 to be achieved by the engine 1 increases to reach the target rotation rate ECRS for the compression unit 50 to be achieved by the engine 1 over the period of time elapsing from t1 to t4.

After the engine 1 is started up, the target rotation rate MCRS for the compression unit 50 to be achieved by the motor unit 70 and the target rotation rate ECRS for the compression unit 50 to be achieved by the engine 1 are compared in step 150, and if the target rotation rate MCRS for the compression unit 50 to be achieved by the motor unit 70 is higher, the motor unit (MTFC) 70 is stopped (t2) in step 160, causing the actual rotation rate CR of the compression unit 50 to become lower than the rotation rate CR1.

Through this process, when the actual rotation rate CR at the compression unit 50 that is caused to fall by the stoppage of the motor unit 70 matches the estimated rotation rate ECR of the compression unit 50 to be achieved by the engine 1 that is caused to rise by the startup of the engine 1 (CR2:t3), the electromagnetic clutch 30 is engaged (ON) to switch from drive by the motor unit 70 to drive by the engine 1. At this time, since the armature 35 is actuated at the point in time at which the rotation rate of the pulley 32 rotated by the engine 1 and the rotation rate of the armature 35 rotated by the rotating shaft 11 become equal to each other, the actuation noise is reduced. In addition, the actual rotation rate CR at the compression unit 50 is raised to reach the target rotation rate CR3 to be achieved by the engine 1 and remains constant after that through the drive implemented by the engine 1.

In addition, if it is decided in step 150 that the target rotation rate ECRS for the compression unit 50 to be achieved by the engine 1 is higher than the target rotation rate MCRS for the compression unit 50 to be achieved by the motor unit 70, the second startup control is executed, in which the operation bypasses steps 160 and 170 to proceed to step 180. When the actual rotation rate CR of the compression unit 50, which is equal to the target rotation rate MCRS for the compression unit 50 to be achieved by the motor unit 70, becomes equal to the estimated rotation rate ECR of the compression unit 50 to be achieved by the engine 1 corresponding to the increase in the rotation rate ER of the engine 1, the operation proceeds to step 190 to engage (ON) the electromagnetic clutch (MGCL) 30. Then, in the case of the sequence described above, it is decided in step 200 that "1" is not set at the flag (FLUG) 1, and thus the operation proceeds to step 210 to stop the operation of the motor unit 17 before returning to the main control routine or the like from step 230.

Figure 5:
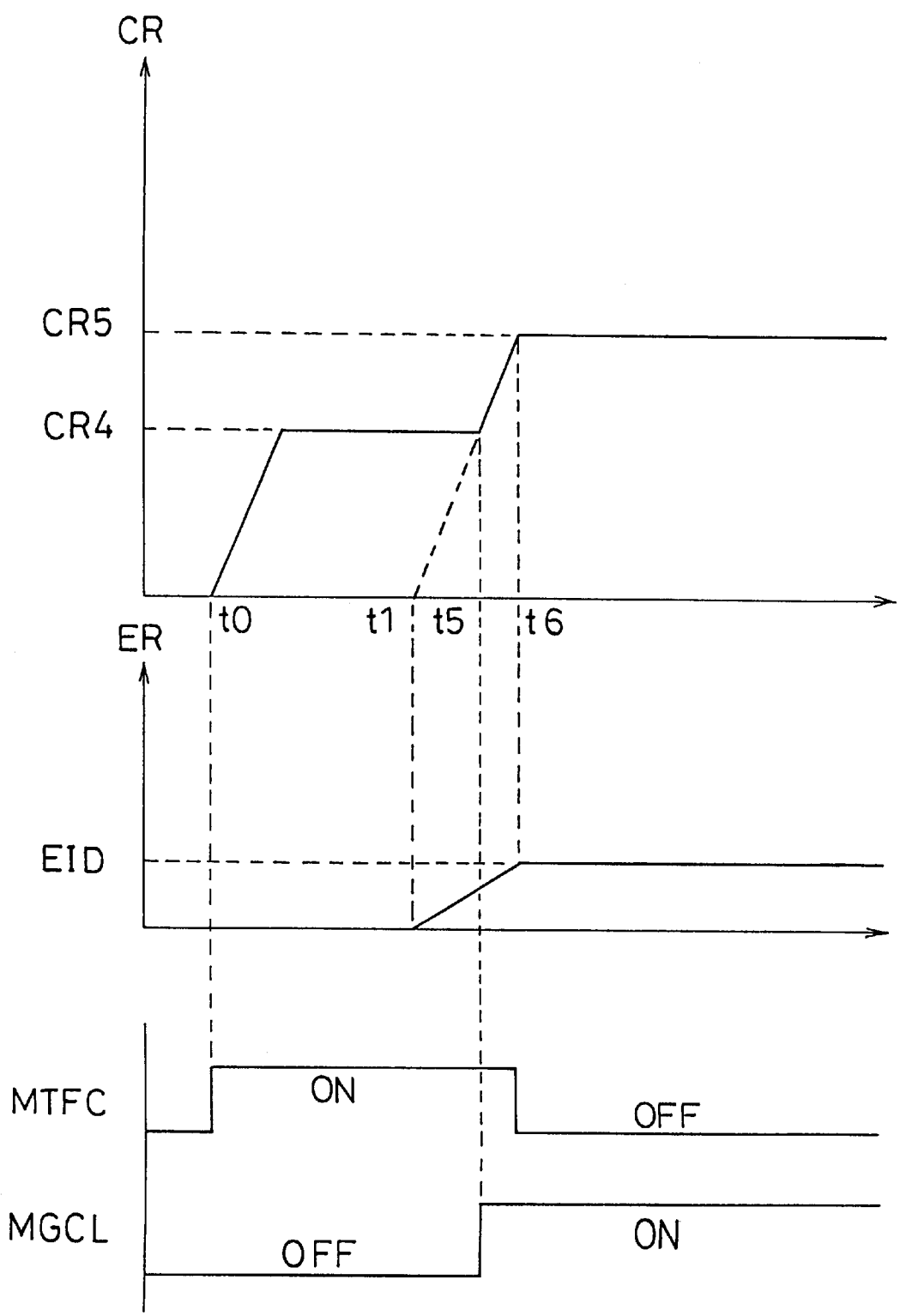
FIG. 5 is a timing chart of the second startup control implemented at an engine startup.

The second startup control described above may be implemented as illustrated in FIG. 5. Namely, if it is decided that operation of the engine 1 and operation of the airconditioning system (A/C) 3 are requested, the motor unit (MTFC) 70 is engaged in operation at t0 and the rotation rate CR of the compression unit 50 is caused to rise up to a rotation rate CR4, which corresponds to the target rotation rate MCRS for the compression unit 50 to be achieved by the motor unit 70 at this time, as in the first startup control explained earlier. After this, the engine 1 is started up at t1, and as the rotation rate ER of the engine 1 increases, the estimated rotation rate ECR of the compression unit 50 to be achieved by the engine 1 rises. At a point in time (t5) at which the estimated rotation rate ECR becomes equal to the rotation rate CR of the compression unit 50, the electromagnetic clutch (MGCL) 30 is engaged to drive the compression unit 50 with the engine 1. During this process, the armature 35 is actuated at the point in time at which the rotation rate of the pulley 32 rotated by the engine 1 and the rotation rate of the armature 35 rotated by the rotating shaft 11 become equal to each other to achieve a reduction in the actuation noise, as in the first startup control. Then, the operation of the motor unit (MTFC) 70 is stopped.

Figure 6:
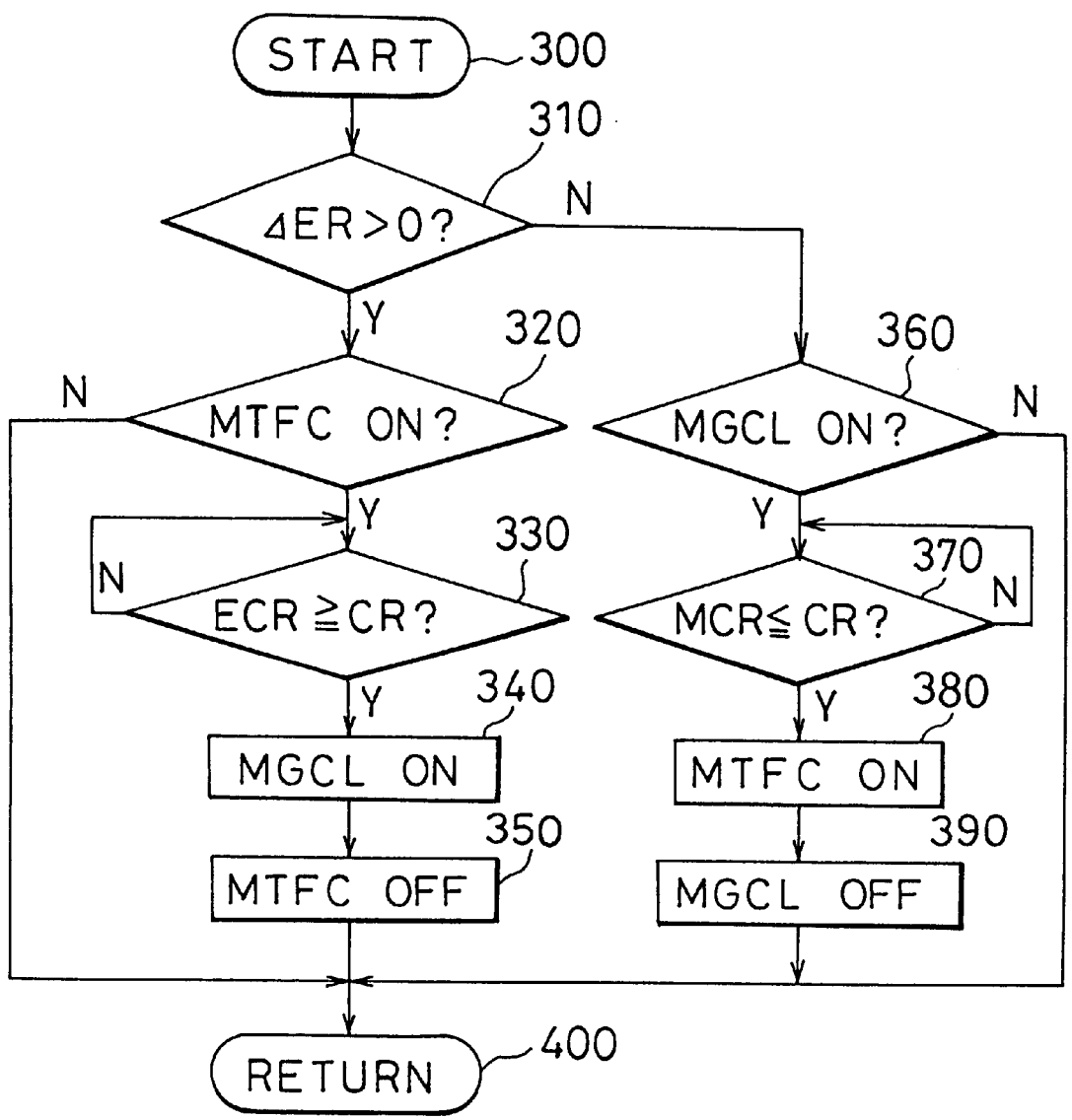
FIG. 6 is a flowchart of the control implemented during acceleration and deceleration.

FIG. 6 is a flowchart of the control implemented on the hybrid compressor 18 when the rotation rate ER of the engine 1 changes. This control starts in step 300, and first, in step 310, a decision is made as to whether the quantity of change ER in the rotation rate of the engine 1 is a positive value or a negative value in order to determine whether the rotation rate ER of the engine is increasing or decreasing. If it is decided that the quantity of change ER is a positive value, acceleration control is executed, whereas if it is decided that the quantity of change ER is a negative value, deceleration control is executed.

If the quantity of change ER is positive, the operation proceeds to step 320 to make a decision as to whether or not the motor unit 70 is engaged in operation, and if it is decided that the motor unit 70 is not engaged, in which case the increasing driving torque of the engine 1 can be maintained unchanged since the compression unit 50 is being driven by the engine 1, the operation exits this control through step 400 to return to the main control or the like.

If, on the other hand, it is decided in step 320 that the motor unit 70 is engaged in operation (ON), it is concluded that the execution of acceleration control is required and thus, the operation proceeds to step 330 to compare the actual rotation rate CR of the compression unit 50 and the estimated rotation rate ECR of the compression unit 50 to be achieved by the engine 1 that increases in correspondence to the increasing rotation rate ER of the engine 1. When CR and ECR become equal to each other, the operation proceeds to step 340 to engage (ON) the electromagnetic clutch (MGCL) 30, and then in step 350, the operation of the motor unit (MTFC) 70 is stopped (OFF) to switch from drive by the motor unit 70 to drive by the engine 1. Through this control, if the rotation rate of the engine 1 is sufficiently high, the compression unit 50 is switched to engine drive to minimize the consumption of the power source that drives the motor unit 70.

Figure 7:
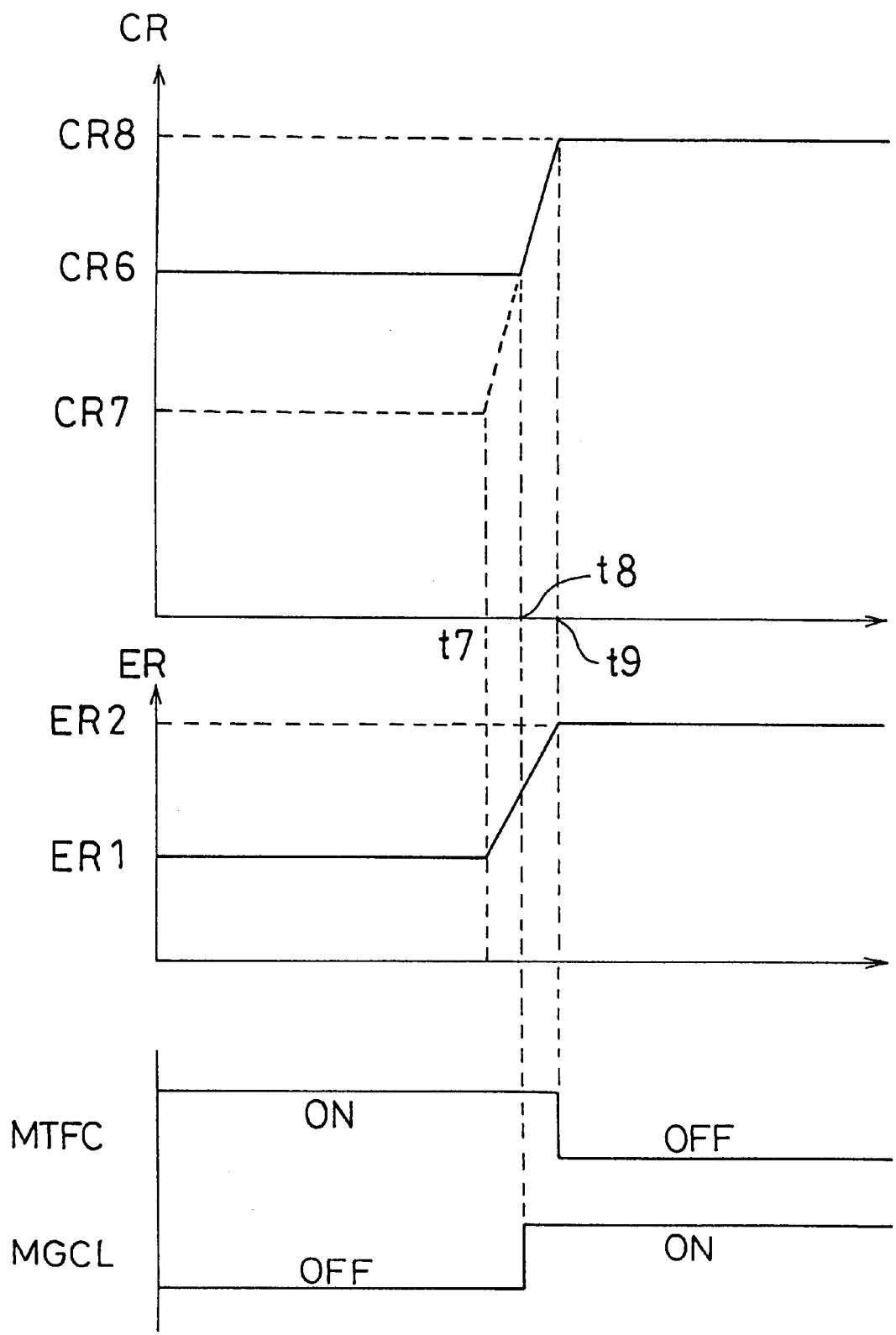
FIG. 7 is a timing chart of the acceleration control.

This control is now explained in reference to the timing chart in FIG. 7. When the rotation rate ER of the engine 1 changes from ER1 to ER2, the quantity of change ER is a positive value (ER=(ER2−ER1)/(t9−t7)>0: ER2−ER1>0, t9−t7>1). At this point, if the motor unit (MTFC) 70 is operating and the compression unit 50 is rotating at a rate CR7, as the rotation rate ER of the engine 1 increases to raise an estimated rotation rate ECR of the compression unit 50 to be achieved by the engine 1 and the estimated rotation rate ECR becomes equal to CR6(t8), the electromagnetic clutch (MGCL) 30 is engaged (ON) and the motor unit (MTFC) 70 is stopped. Then, the rotation rate CR of the compression unit 50 rises to a rotation rate CR8 which constitutes the target rotation rate MCRS to be achieved by the engine 1.

If, on the other hand, it is decided in step 310 that the quantity of change ER is a negative value, the operation proceeds to step 360 to make a decision as to whether or not the electromagnetic clutch (MGCL) 30 is engaged (ON). If it is decided that the electromagnetic clutch (MGCL) 30 is not engaged, the quantity of discharge from the compression unit 50 remains unaffected even when the driving torque of the engine 1 becomes reduced, since the compression unit 50 is already driven by the motor unit 70 and, thus, the operation exits the control through step 400 to return to the main control routine or the like.

In addition, if it is decided in step 360 that the electromagnetic clutch (MGCL) 30 is engaged (ON), it is decided that deceleration control is required. Thus, the operation proceeds to step 370 to compare the actual rotation rate CR of the compression unit 50 rotated by the engine 1 and the estimated rotation rate MCR of the compression unit 50 to be achieved by the motor unit 70, and the operation proceeds to step 380 when CR and MCR become equal to each other to engage the motor unit (MTFC) 70 in operation (ON). Then, in step 390, the operation of the electromagnetic clutch (MGCL) 30 is stopped (OFF), to switch from drive by the engine 1 to drive by the motor unit 70. Through this control, the drive of the compression unit 50 is switched to the motor unit to assure a sufficient driving force for the compression unit 50 when the rotation rate of the engine 1 decreases and a sufficient rotation rate or sufficient drive torque cannot be obtained.

Figure 8:
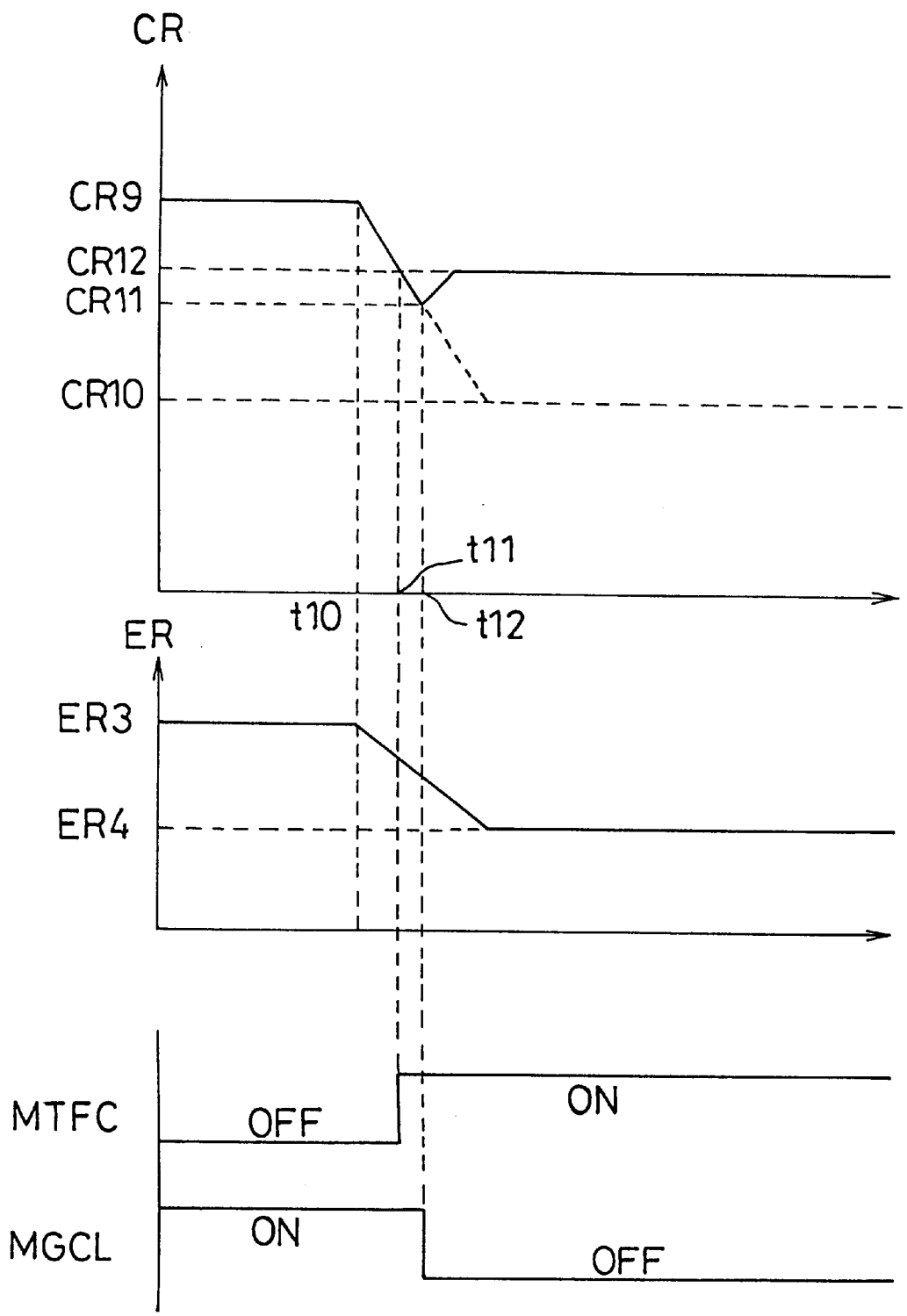
FIG. 8 is a timing chart of the deceleration control.

This deceleration control is now explained in reference to the timing chart in FIG. 8. When the rotation rate ER of the engine 1 changes from ER3 to ER4 with a negative quantity of change ER (ER=(ER4−ER3)/(t12−t10)<0: ER4−ER3<0, t12−t10>0) while the electromagnetic clutch (MGCL) 30 is engaged, the reduction in the rotation rate ER of the engine 1 causes the actual rotation rate CR of the compression unit 50 to decrease from CR9 to CR10. Under these circumstances, an operation of the motor unit 70 is started (ON) at a point in time (t11) at which the actual rotation rate CR of the compression unit 50 is reduced to a rotation rate CR12, which is equivalent to the estimated rotation rate MCR of the compression unit 50 to be achieved by the motor unit 70 and, subsequently, the electromagnetic clutch (MGCL) 30 is cut off (OFF) at t12. This operation through which an operation of the motor unit 70 can be started at a position at which the actual rotation rate CR of the compression unit 50 is close to the target rotation rate MCR, makes it possible to raise the actual rotation rate CR to the target rotation rate MCR quickly after the electromagnetic clutch (MGCL) 30 is cut off to achieve a smooth shift from engine drive to motor drive.

Figure 9:
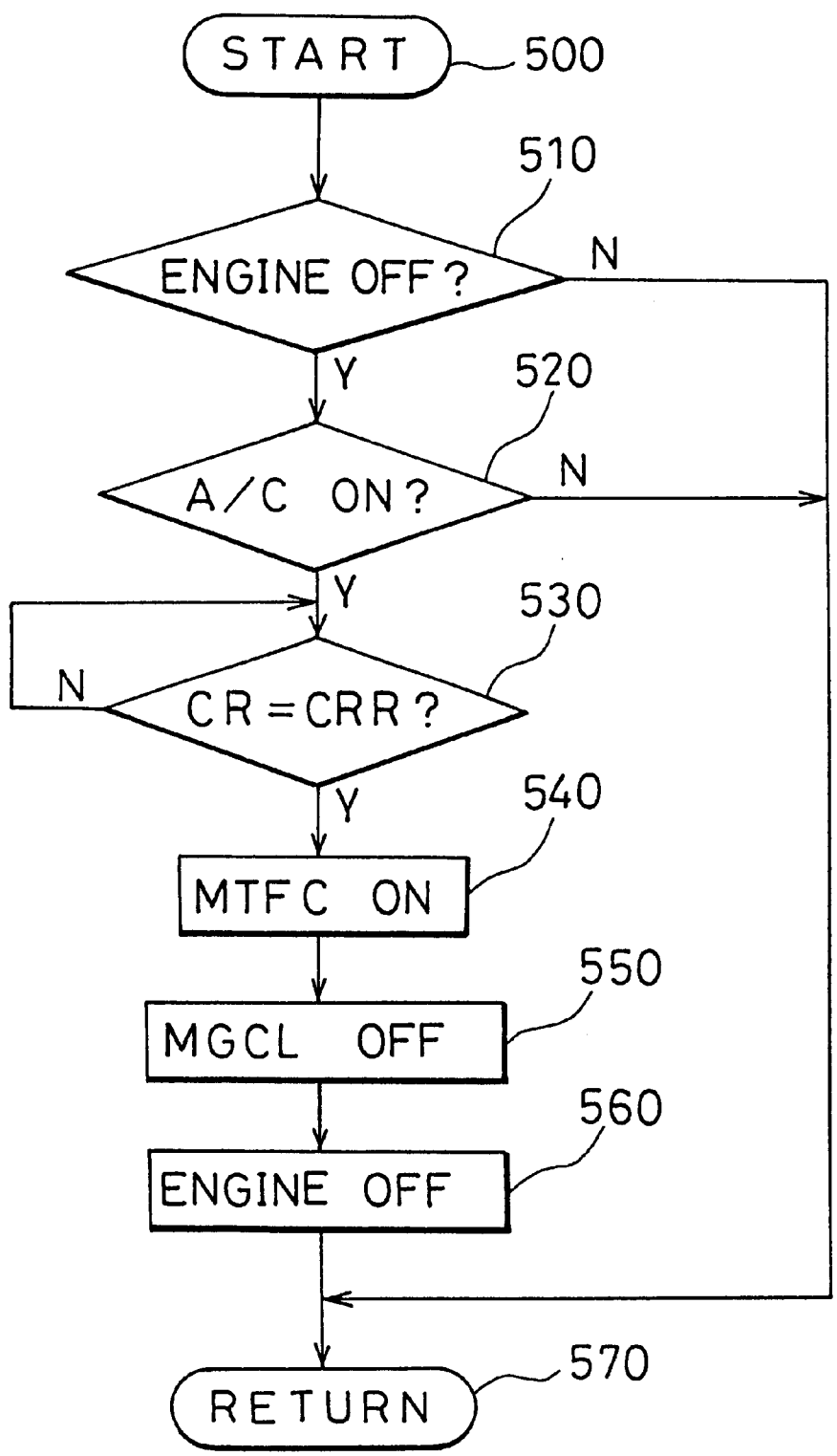
FIG. 9 is a flowchart of the stop control implemented at engine stop.

FIG. 9 is a flowchart of the stop control. In this flowchart, the operation starts in step 500, and in step 510 a decision is made as to whether or not it is requested to stop the engine 1. If it is decided that there is a request to stop the engine 1, the operation proceeds to step 520 to make a decision as to whether or not there is a request to engage the airconditioning system (A/C) 3 in operation. If it is decided that there is a request to stop the operation of the engine 1 and that there is a request to engage the airconditioning system (A/C) 3 in operation through the decision-making process described above, the stop control is executed. First, in step 530, a decision is made as to whether or not the actual rotation rate CR of the compression unit 50 is equal to a specific rotation rate CRR. If it is decided that the actual rotation rate CR of the compression unit 50 is equal to the specific rotation rate CRR, the operation proceeds to step 540 to start an operation of the motor unit 70 (ON), and then the operation proceeds to step 550 to cut off the electromagnetic clutch (MGCL) 30. Next, the operation proceeds to step 560 to stop (OFF) the operation of the engine 1. This control, through which the motor unit 70 is first driven at the specific rotation rate CRR before the engine 1 is stopped and then the electromagnetic clutch 30 is cut off, achieves a smooth shift from drive by the engine 1 to drive by the motor unit 70. Then, the operation exits this control through step 570 to return to the main control routine or the like.

In addition, a timer may be provided to operate between step 540 and step 550 and/or between step 550 and step 560 to achieve a specific time lag between step 540, in which the motor unit (MTFC) 70 is engaged (ON), and step 550, in which the electromagnetic clutch (MGCL) 30 is cut off, and/or between step 550, in which the electromagnetic clutch (MGCL) 30 is cut off and step 560, in which the engine 1 is stopped.

Figure 10:
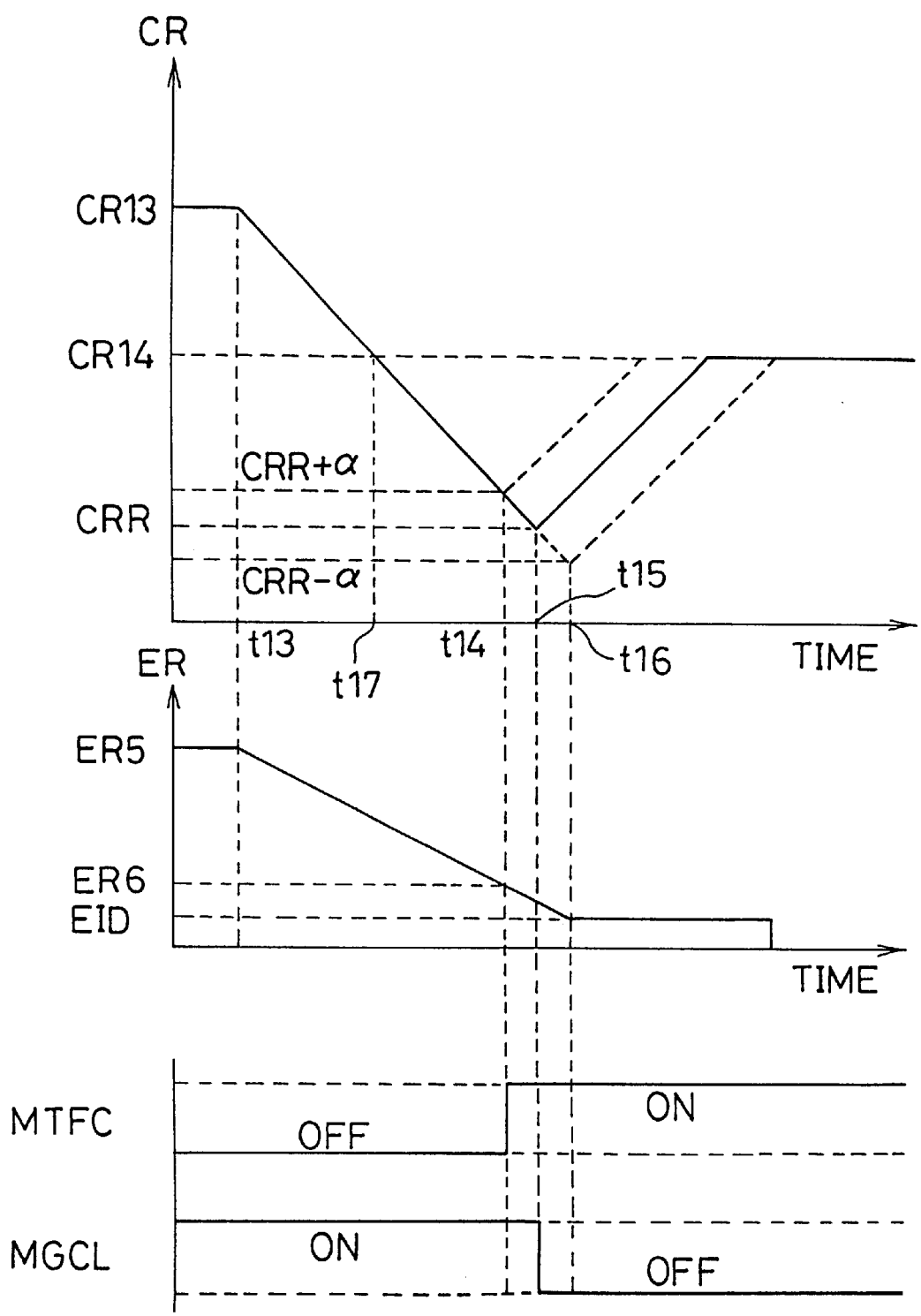
FIG. 10 is a timing chart of the stop control.

The stop control described above is further explained in reference to the timing chart in FIG. 10. If an engine stop is requested while the engine 1 is operating at the specific rotation rate ER5, the rotation rate of the engine 1 is reduced from the specific rotation rate ER5 to the idling rotation rate EID, and before the rotation rate CR of the compression unit 50 is reduced from a specific rotation rate CR13 to a rotation rate CRR−α, corresponding to the idling rotation rate of the engine 1, e.g., at a point in time (t14) at which the rotation rate ER of the engine 1 becomes equal to ER6, i.e., at the time point (t14) at which the actual rotation rate CR of the compression unit 50 reaches a rotation rate CRR+α, an operation of the motor unit (MTFC) 70 is started (ON). Then, at a point in time (t15) at which the rotation rate CR becomes equal to the rotation rate CRR, the electromagnetic clutch (MGCL) 30 is cut off (OFF).

It is to be noted that while the rotation rate CRR is set by adding a specific rotation rate (e.g., 200 rpm) to the estimated rotation rate MCR of the compression unit 50 corresponding to the idling rotation rate EID, it may be set instead at the target rotation rate MCRS (which corresponds to CR14) to be achieved by the motor unit (MTFC) 70 explained earlier.

In addition, the motor unit (MTFC) 70 may be started up during the period of time elapsing between the point in time (t17) at which the actual rotation rate CR of the compression unit 50 reaches CR14 and a point in time (t16) immediately before the estimated rotation rate ECR of the compression unit 50 corresponding to the idling rotation rate EID of the engine 1 reaches the rotation rate (CRR−α), with the electromagnetic clutch 30 subsequently cut off within the time range described above.

Furthermore, the hybrid compressor according to the present invention, which is provided with a dedicated motor for driving the compressor which is separate from the drive motor, can be operated even when the drive engine is in a stopped state and, therefore, the airconditioning system can be continuously operated while the engine is not engaged. Thus, the hybrid compressor according to the present invention can be adopted in an idle-stop vehicle as well.

As has been explained, according to the present invention, in which the electromagnetic clutch is engaged to switch from motor drive to engine drive when the rotation rate of the compression unit and the engine rotation rate match during an engine startup or an engine acceleration, the pulley at the electromagnetic clutch that rotates in unison with the engine and the armature of the electromagnetic clutch that rotates in unison with the rotating shaft become linked with each other to rotate together at the same or at nearly the same rotation rate to achieve a reduction in the actuation noise at the electromagnetic clutch and a smooth shift from motor drive to engine drive.

In addition, even during motor drive, if a sufficient drive torque can be obtained through the engine, the operation shifts from motor drive to engine drive so that the consumption of the power source of the motor can be minimized.

Furthermore, since the compressor is caused to rotate by the motor prior to engine startup, the load occurring at the engine startup is reduced.

Moreover, since the motor is driven before the electromagnetic clutch is cut off to switch from engine drive to motor drive during an engine stop or an engine deceleration, the motor startup torque can be reduced to minimize consumption of the power supply.

What is claimed is:

1. A control apparatus for a hybrid compressor comprising a rotary shaft, a compression unit having a compression space whose volumetric capacity is variable in response to rotation of the rotary shaft, an electromagnetic clutch that communicates rotation of an engine to the rotary shaft via a pulley, and a motor unit comprising a rotor and a stator, the rotor being secured to the rotary shaft and the stator facing opposite the rotor, the hybrid compressor being installed in an airconditioning system, said control apparatus comprising:

an engine operation decision-maker that determines whether the engine is to stop operation;

an airconditioning system operation decision-maker that determines whether the airconditioning system is required to operate;

a motor unit driver that
sets the motor unit into an ON state,
drives the motor unit, and
sets the motor unit into an OFF state;

an electromagnetic clutch driver that
sets the electromagnetic clutch into an ON state, thereby linking the pulley with the rotary shaft, and
sets the electromagnetic clutch into an OFF state, thereby cutting off the pulley from the rotary shaft;

an engine driver that drives the engine; and a stop controller, wherein said stop controller
cuts off the linkage between the pulley and the rotary shaft by setting the electromagnetic clutch into the OFF state via said electromagnetic clutch driver, when the motor unit is in an ON state, and p2 stops driving of the engine via said engine driver, when said engine operation decision-maker determines that the engine is to stop operation and said airconditioning system operation decision-maker determines that the airconditioning system is required to operate.

2. A control device for a hybrid compressor according to claim 1, further comprising:

an engine rotation rate detector that detects a rotation rate of the engine;

wherein said stop controller
initiates operation of the motor unit via said motor unit driver when the rotation rate of the engine detected by said engine rotation rate detector has decreased to a first specific rotation rate, and
cuts off the linkage between the pulley and the rotary shaft by setting the electromagnetic clutch into the OFF state via said electromagnetic clutch driver, when the rotation rate of the engine has further decreased to a second specific rotation rate lower than the first specific rotation rate.

3. A control apparatus for a hybrid compressor according to claim 2, further comprising:

a compression unit rotation rate detector that detects an actual rotation rate of the compression unit;

a target discharge quantity calculator that performs an arithmetic operation to determine the quantity of discharge achieved by the compression unit based upon a heat load factor;

a motor target rotation rate setter that sets a motor target rotation rate for the compression unit to achieve via the motor unit, the motor target rotation rate being based upon the target discharge quantity calculated by said target discharge quantity calculator;

a motor unit drive decision-maker that determines whether the motor unit is operating at the motor target rotation rate set by said motor target rotation rate setter;

an engine target rotation rate setter that sets an engine target rotation rate for the compression unit to achieve via the engine, the engine target rotation rate being based upon the target discharge quantity calculated by said target discharge quantity calculator;

an engine rotation rate detector that detects an actual rotation rate of the engine;

an estimated rotation rate calculator that performs an arithmetic operation to determine an estimated rotation rate of the compression unit that corresponds to the actual rotation rate detected by said engine rotation rate detector;

a target rotation rate comparator that
starts up the motor unit via said motor unit driver, when said engine operation decision-maker determines that the engine is to be started up and said airconditioning system operation decision-maker determines that the airconditioning system is required to operate,
starts up the engine via the engine driver after said motor unit drive decision-maker determines that the motor unit is operating at the motor target rotation rate,
compares the motor target rotation rate set by said motor target rotation rate setter and the engine target rotation rate set by said engine target rotation rate setter,
determines whether the engine target rotation rate is lower than the motor target rotation rate,
and determines whether the engine target rotation rate is higher than the motor target rotation rate;

a first startup controller that
sets the motor unit into the OFF state via said motor unit driver, when said target rotation rate comparator determines that the engine target rotation rate is lower than the motor target rotation rate, and
sets the electromagnetic clutch into the ON state via said electromagnetic clutch driver, thereby linking the pulley with the rotary shaft, when the actual rotation rate detected by said compression unit rotation rate detector matches the estimated rotation rate calculated by said estimated rotation rate calculator; and a second startup controller that
sets the electromagnetic clutch into the ON state via said electromagnetic clutch driver, thereby linking the pulley with the rotary shaft, when the estimated rotation rate calculated by said estimated rotation rate calculator matches the actual rotation rate detected by said compression unit rotation rate detector, and
sets the motor unit into the OFF state via said motor unit driver, when said target rotation rate comparator determines that the engine target rotation rate is higher than the motor target rotation rate.

4. A control apparatus for a hybrid compressor according to claim 3, further comprising an acceleration controller that
sets the electromagnetic clutch into the ON state via said electromagnetic clutch driver to link the pulley and the rotary shaft, when the estimated rotation rate calculated by said estimated rotation rate calculator is equal to, or greater than, the actual rotation rate detected by said compression unit rotation rate detector, while the motor unit is driven by said motor unit driver, and while the electromagnetic clutch is set in an OFF state by said electromagnetic clutch driver, and sets the motor unit into the OFF state via said motor unit driver.

5. A control apparatus for a hybrid compressor according to claim 4, further comprising a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver and while the motor unit is set in an OFF state by said motor unit driver, and cuts off the linkage between the pulley and the rotary shaft by setting the electromagnetic clutch into the OFF state via said electromagnetic clutch driver.

6. A control apparatus for a hybrid compressor according to claim 3, further comprising a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

7. A control apparatus for a hybrid compressor according to claim 2, further comprising:

a compression unit rotation rate detector that detects an actual rotation rate of the compression unit;

an estimated rotation rate calculator that performs an arithmetic operation to determine an estimated rotation rate of the compression unit that corresponds to the actual rotation rate detected by said engine rotation rate detector; and an acceleration controller that sets the electromagnetic clutch into the ON state via said electromagnetic clutch driver to link the pulley and the rotary shaft, when the estimated rotation rate calculated by said estimated rotation rate calculator is equal to, or greater than, the actual rotation rate detected by said compression unit rotation rate detector, while the motor unit is driven by said motor unit driver, and while the electromagnetic clutch is set in an OFF state by said electromagnetic clutch driver, and sets the motor unit into an OFF state via said motor unit driver.

8. A control apparatus for a hybrid compressor according to claim 7, further comprising:

a target discharge quantity calculator that performs an arithmetic operation to determine the quantity of discharge from the compression unit based upon a heat load factor;

a motor target rotation rate setter that sets a motor target rotation rate for the compression unit to achieve via the motor unit based upon the target discharge quantity calculated by said target discharge quantity calculator; and a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

9. A control apparatus for a hybrid compressor according to claim 2, further comprising:

a compression unit rotation rate detector that detects an actual rotation rate of the compression unit;

a target discharge quantity calculator that performs an arithmetic operation to determine the quantity of discharge from the compression unit based upon a heat load factor;

a motor target rotation rate setter that sets a motor target rotation rate for the compression unit to achieve via the motor unit based upon the target discharge quantity calculated by said target discharge quantity calculator; and a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

10. A control apparatus for a hybrid compressor according to claim 1, further comprising:

a compression unit rotation rate detector that detects an actual rotation rate of the compression unit;

a target discharge quantity calculator that performs an arithmetic operation to determine the quantity of discharge achieved by the compression unit based upon a heat load factor;

a motor target rotation rate setter that sets a motor target rotation rate for the compression unit to achieve via the motor unit, the motor target rotation rate being based upon the target discharge quantity calculated by said target discharge quantity calculator;

a motor unit drive decision-maker that determines whether the motor unit is operating at the motor target rotation rate set by said motor target rotation rate setter;

an engine target rotation rate setter that sets an engine target rotation rate for the compression unit to achieve via the engine, the engine target rotation rate being based upon the target discharge quantity calculated by said target discharge quantity calculator;

an engine rotation rate detector that detects an actual rotation rate of the engine;

an estimated rotation rate calculator that performs an arithmetic operation to determine an estimated rotation rate of the compression unit that corresponds to the actual rotation rate detected by said engine rotation rate detector;

a target rotation rate comparator that starts up the motor unit via said motor unit driver when said engine operation decision-maker determines that the engine is to be started up and said airconditioning system operation decision-maker determines that the airconditioning system is required to operate, starts up the engine via said engine driver after said motor unit drive decision-maker determines that the motor unit is operating at the motor target rotation rate, and compares the motor target rotation rate set by said motor target rotation rate setter and the engine target rotation rate set by said engine rotation rate setter;

a first startup controller that sets the motor unit into the OFF state via said motor unit driver when said target rotation rate comparator determines that the engine target rotation rate is lower than the motor target rotation rate, and sets the electromagnetic clutch into the ON state via said electromagnetic clutch driver, thereby linking the pulley with the rotary shaft, when the actual rotation rate detected by said compression unit rotation rate detector matches the estimated rotation rate calculated by said estimated rotation rate calculator; and a second startup controller that sets the electromagnetic clutch into the ON state via said electromagnetic clutch driver, thereby linking the pulley with the rotary shaft, when said estimated rotation rate calculated by said estimated rotation rate calculator matches the actual rotation rate detected by said compression unit rotation rate detector, and sets the motor unit into the OFF state via said motor unit driver, when said target rotation rate comparator determines that the engine target rotation rate is higher than the motor target rotation rate.

11. A control apparatus for a hybrid compressor according to claim 10, further comprising an acceleration controller that sets the electromagnetic clutch into the ON state via said electromagnetic clutch driver to link the pulley and the rotary shaft, when the estimated rotation rate calculated by said estimated rotation rate calculator is equal to, or greater than, the actual rotation rate detected by said compression unit rotation rate detector, while the motor unit is driven by said motor unit driver, and while the electromagnetic clutch is set in an OFF state by said electromagnetic clutch driver, and sets the motor unit into an OFF state via said motor unit driver.

12. A control apparatus for a hybrid compressor according to claim 11, further comprising a deceleration controller that starts the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

13. A control apparatus for a hybrid compressor according to claim 10, further comprising a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

14. A control apparatus for a hybrid compressor according to claim 1, further comprising:

a compression unit rotation rate detector that detects an actual rotation rate of the compression unit;

an engine rotation rate detector that detects an actual rotation rate of the engine;

an estimated rotation rate calculator that performs an arithmetic operation to determine an estimated rotation rate of the compression unit that corresponds to the actual rotation rate detected by said engine rotation rate detector; and an acceleration controller that sets the electromagnetic clutch into the ON state via said electromagnetic clutch driver to link the pulley and the rotary shaft, when the estimated rotation rate calculated by said estimated rotation rate calculator is equal to, or greater than, the actual rotation rate detected by said compression unit rotation rate detector, while the motor unit is driven by said motor unit driver and while the electromagnetic clutch is set in an OFF state by said electromagnetic clutch driver, and sets the motor unit into an OFF state via said motor unit driver.

15. A control apparatus for a hybrid compressor according to claim 14, further comprising:

a target discharge quantity calculator that performs an arithmetic operation to determine the quantity of discharge from the compression unit based upon a heat load factor;

a motor target rotation rate setter that sets a motor target rotation rate for the compression unit to achieve via the motor unit based upon the target discharge quantity calculated by said target discharge quantity calculator; and a deceleration controller that starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and cuts off the linkage between the pulley and the rotary shaft by setting the electromagnetic clutch into the OFF state via said electromagnetic clutch driver.

16. A control apparatus for a hybrid compressor according to claim 1, further comprising:

a compression unit rotation rate detector that detects an actual rotation rate of the compression unit;

a target discharge quantity calculator that performs an arithmetic operation to determine the quantity of discharge from the compression unit based upon a heat load factor;

a motor target rotation rate setter that sets a motor target rotation rate for the compression unit to achieve via the motor unit based upon the target discharge quantity calculated by said target discharge quantity calculator; and a deceleration controller that
starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and
cuts off the linkage between the pulley and the rotary shaft by setting the electromagnetic clutch into the OFF state via said electromagnetic clutch driver.

17. A control apparatus for a hybrid compressor, the hybrid compressor comprising a rotary shaft, a compression unit having a compression space whose volumetric capacity is variable in response to rotation of the rotary shaft, an electromagnetic clutch that communicates rotation of an engine to the rotary shaft via a pulley, and a motor unit comprising a rotor and a stator, the rotor being secured to the rotary shaft and the stator facing opposite the rotor, the hybrid compressor being installed in an airconditioning system, said control apparatus comprising:

an engine operation decision-maker that determines whether the engine is to stop operation, an airconditioning system operation decision-maker that determines whether the airconditioning system is required to operate;

a motor unit driver that
places the motor unit into an ON state,
drives the motor unit, and
places the motor unit into an OFF state;

an electromagnetic clutch driver that
places the electromagnetic clutch into an ON state, thereby linking the pulley with the rotary shaft, and
places the electromagnetic clutch into an OFF state, thereby cutting off the pulley from the rotary shaft;

an engine driver that drives the engine;

a compression unit rotation rate detector that detects an actual rotation rate of the compression unit;

an engine rotation rate detector that detects an actual rotation rate of the engine;

an estimated rotation rate calculator that performs an arithmetic operation to determine an estimated rotation rate of the compression unit that corresponds to the actual rotation rate detected by said engine rotation rate detector;

a target discharge quantity calculator that performs an arithmetic operation to determine the quantity of discharge achieved by the compression unit based upon a heat load factor;

a motor target rotation rate setter that sets a motor target rotation rate for the compression unit to achieve via the motor unit based upon the target discharge quantity calculated by said target discharge quantity calculator; and an acceleration controller, wherein said acceleration controller
sets the electromagnetic clutch into the ON state via said electromagnetic clutch driver to link the pulley and the rotary shaft, when the estimated rotation rate calculated by said estimated rotation rate calculator is equal to, or greater than, the actual rotation rate detected by said compression unit rotation rate detector, while the motor unit is driven by said motor unit driver, and while the electromagnetic clutch is set in an OFF state by said electromagnetic clutch driver, and
sets the motor unit into an OFF state via said motor unit driver.

18. A control apparatus for a hybrid compressor according to claim 17, further comprising a deceleration controller that
starts up the motor unit via said motor unit driver at a point in time at which the actual rotation rate detected by said compression unit rotation rate detector is equal to, or less than, the motor target rotation rate set by motor target rotation rate setter, while the electromagnetic clutch is set in an ON state by said electromagnetic clutch driver, and while the motor unit is set in an OFF state by said motor unit driver, and
cuts off the linkage between the pulley and the rotary shaft by setting the electromagnetic clutch into the OFF state via said electromagnetic clutch driver.

19. A control apparatus for a hybrid compressor according to claim 18, further comprising:

a motor unit drive decision-maker that determines whether the motor unit is operating at the motor target rotation rate set by said motor target rotation rate setter;

an engine target rotation rate setter that sets an engine target rotation rate for the compression unit to achieve via the engine based upon the target discharge quantity calculated by said target discharge quantity calculator;

a target rotation rate comparator that
starts up the motor unit via said motor unit driver when said engine operation decision-maker determines that the engine is to be started up and said airconditioning system operation decision-maker determines that the airconditioning system is required to operate,
starts up the engine via said engine driver after said motor unit drive decision-maker determines that the motor unit is operating at the motor target rotation rate, and
compares the motor target rotation rate set by said motor target rotation rate setter and the engine target rotation rate set by the engine rotation rate setter;

a first startup controller that
stops the drive of the motor unit via said motor unit driver, when said target rotation rate comparator determines that the engine target rotation rate is lower than the motor target rotation rate, and
sets the electromagnetic clutch into the ON state via said electromagnetic clutch driver, thereby linking the pulley with the rotary shaft, when the actual rotation rate detected by said compression unit rotation rate detector matches the estimated rotation rate calculated by said estimated rotation rate calculator; and a second startup controller that
sets the electromagnetic clutch into the ON state via said electromagnetic clutch driver, thereby linking the pulley with the rotary shaft, when the estimated rotation rate calculated by said estimated rotation rate calculator matches the actual rotation rate detected by said compression unit rotation rate detector, and stops the drive of the motor unit via said motor unit driver, when said target rotation rate comparator determines that the engine target rotation rate is higher than the motor target rotation rate.

20. A control apparatus for a hybrid compressor, the hybrid compressor comprising a rotary shaft, a compression unit having a compression space whose volumetric capacity is variable in response to rotation of the rotary shaft, an electromagnetic clutch that communicates rotation of an engine to the rotary shaft via a pulley, and a motor unit comprising a rotor and a stator, the rotor being secured to the rotary shaft and the stator facing opposite the rotor, the hybrid compressor being installed in an airconditioning system, said control apparatus comprising:

an engine operation decision-maker that determines whether the engine is to stop operation;

an airconditioning system operation decision-maker that determines whether the airconditioning system is required to operate;

a motor unit driver that
places the motor unit into an ON state,
drives the motor unit, and
places the motor unit into an OFF state;

an electromagnetic clutch driver that
places the electromagnetic clutch into an ON state, thereby linking the pulley with the rotary shaft, and
places the electromagnetic clutch into an OFF state, thereby cutting off the pulley from the rotary shaft;

an engine driver that drives the engine;

a compression unit rotation rate detector that detects an actual rotation rate of the compression unit;

an engine rotation rate detector that detects an actual rotation rate of the engine;

an estimated rotation rate calculator that performs an arithmetic operation to determine an estimated rotation rate of the compression unit that corresponds to the actual rotation rate detected by said engine rotation rate detector;

a target discharge quantity calculator that performs an arithmetic operation to determine the quantity of discharge achieved by the compression unit based upon a heat load factor;

a motor target rotation rate setter that sets a motor target rotation rate for the compression unit to achieve via the motor unit based upon the target discharge quantity calculated by said target discharge quantity calculator; and a deceleration controller, wherein said deceleration controller
starts up the motor unit via said motor unit driver at a point in time at which the actual rotation rate detected by said compression unit rotation rate detector is equal to, or less than, the motor target rotation rate set by said motor target rotation rate setter, while the electromagnetic clutch is set in an ON state by said electromagnetic clutch driver, and while the motor unit is set in an OFF state by said motor unit driver, and
cuts off the linkage between the pulley and the rotary shaft by setting the electromagnetic clutch into the OFF state via said electromagnetic clutch driver.

* * * * *